US012767606B1

(12) United States Patent
Western et al.

(10) Patent No.: US 12,767,606 B1
(45) Date of Patent: Oct. 20, 2026

(54) MELT INFILTRATION OF CERAMIC MATRIX COMPOSITE COMPONENTS

(71) Applicant: Rolls-Royce High Temperature Composites, Inc., Cypress, CA (US)

(72) Inventors: Timothy Western, Cypress, CA (US); Pathikumar Sellappan, Cypress, CA (US); Sajan Singh Virdi, Cypress, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 0 days.

(21) Appl. No.: 18/887,548

(22) Filed: Sep. 17, 2024

(51) Int. Cl.
*C04B 35/80* (2006.01)
*C04B 35/628* (2006.01)
*C04B 35/657* (2006.01)

(52) U.S. Cl.
CPC ........ *C04B 35/80* (2013.01); *C04B 35/62878* (2013.01); *C04B 35/62886* (2013.01); *C04B 35/657* (2013.01); *C04B 2235/3826* (2013.01); *C04B 2235/428* (2013.01); *C04B 2235/5244* (2013.01); *C04B 2235/616* (2013.01)

(58) Field of Classification Search
CPC ................................................ C04B 2235/616
See application file for complete search history.

(56) References Cited

U.S. PATENT DOCUMENTS 8,182,738 B2 5/2012 Kienzle et al.
10,150,708 B2 12/2018 Shim et al.
10,458,653 B2 10/2019 Freeman et al.
10,774,010 B2 9/2020 Shim et al.
11,021,779 B2 6/2021 Barrett et al.
11,286,208 B2 3/2022 Sellinger et al.
2016/0159699 A1* 6/2016 Lazur ...................... C04B 35/80 156/283
2016/0326064 A1* 11/2016 Shim ...................... C04B 35/573
2017/0313627 A1 11/2017 Shim et al.
2019/0203378 A1* 7/2019 Johnson .................. C30B 15/02
2020/0040481 A1* 2/2020 Ding ....................... C30B 15/06

OTHER PUBLICATIONS

U.S. Appl. No. 18/887,565, filed Sep. 17, 2024, naming inventors Western et al.
Office Action from U.S. Appl. No. 18/887,565 dated Jun. 16, 2026, 13 pp.

* cited by examiner

*Primary Examiner* — Robert A Vetere
(74) *Attorney, Agent, or Firm* — Shumaker & Sieffert, P.A.

(57) ABSTRACT

A melt infiltration apparatus for a ceramic matrix composite (CMC) component. The melt infiltration apparatus includes a crucible. The crucible configured to contain a volume of molten silicon that infiltrates the CMC component during a melt infiltration process. The volume of molten silicon fills the crucible to a defined liquid level in the crucible. A first stabilizer is configured to mechanically support the CMC component from a first side and a second stabilizer is configured to mechanically support the CMC component from a second side opposite the first side. The first stabilizer and the second stabilizer are configured to suspend the CMC component above the liquid level during the melt infiltration process.

16 Claims, 7 Drawing Sheets

MELT INFILTRATION OF CERAMIC MATRIX COMPOSITE COMPONENTS

TECHNICAL FIELD

The disclosure relates to ceramic matrix composite components. More particularly, the disclosure relates to apparatus and techniques used to fabricate ceramic matrix composite components.

BACKGROUND

Gas turbine engine components are exposed to high temperature environments with an increasing demand for even higher temperatures. Economic and environmental concerns relating to the reduction of emissions and the increase of efficiency are driving the demand for higher gas turbine operating temperatures. In order to meet these demands, temperature capability of the components in hot sections such as blades, vanes, blade tracks, seal segments and combustor liners must be increased.

Ceramic matrix composites (CMCs) may be a candidate for inclusion in the hot sections where higher gas turbine engine operating temperatures are required. One benefit of CMC engine components is the high-temperature mechanical, physical, and chemical properties of the CMCs which allow the gas turbine engines to operate at higher temperatures than certain current engines.

SUMMARY

Ceramic matrix composite (CMC) components are well-suited for high-temperature mechanical systems because of their toughness, thermal resistance, high temperature strength, chemical stability, and light weight relative to components made from other materials. For these reasons, CMC components may be used in gas turbine engines. Some example applications include blades, vanes, blade tracks, seal segments, combustor liners, stiffeners, and other components.

CMC components may include ceramic fibers embedded in a ceramic matrix. The ceramic fibers may include a continuous or discontinuous reinforcement material such as a monofilament or multifilament weave of ceramic fibers. To fabricate the CMC component, the ceramic fibers may be shaped into a ceramic fiber preform. The ceramic matrix may be infiltrated into the ceramic fiber preform to fill in gaps within the ceramic fiber preform and densified to create the CMC component with ceramic fibers embedded in a ceramic matrix.

The ceramic matrix may be generated in a series of steps. For example, one or more layers may be built up on the ceramic fibers by a chemical vapor infiltration (CVI) and/or chemical vapor deposition (CVD) step. A slurry infiltration step may infiltrate a slurry containing carbon and/or silicon carbide into the preform. A melt infiltration step may infiltrate the CMC component with molten silicon. The silicon metal may combine with carbon to create a silicon carbide matrix between the ceramic fibers, and may be hardened to create a dense CMC component.

Before the melt infiltration step, the CMC component may contain a plurality of voids between the ceramic fibers. The voids, in total, may be referred to as the void volume of the CMC component. During the melt infiltration step, it may be desirable to completely infiltrate and fill the void volume of the CMC component with molten silicon. However, using excess molten silicon during melt infiltration may not be desirable, because excess molten silicon may lead to deleterious defects on the CMC component. For example, certain melt infiltration apparatus and techniques may immerse all or part of the CMC component in the molten silicon during melt infiltration. Immersion of the CMC component in the molten silicon may lead to excess silicon or silicon-containing ceramic built up as a surface layer on the surface of the CMC component. Furthermore, in examples where only a portion of the CMC component is immersed in the molten silicon, an undesirable difference may appear on the surface of the CMC component at the interface between the portion of the CMC component that was submerged in the molten silicon and the portion of the CMC component that was not submerged in the molten silicon. Accordingly, the component surface the CMC component may be non-uniform in appearance and/or material properties.

Additionally, certain melt infiltration apparatus and techniques may mechanically support the CMC component during the melt infiltration with tooling. In these certain examples, the points or areas where the tooling contacts the CMC component may exhibit defects due to reduced infiltration in the area and/or underbuilding or overbuilding of the silicon alloy layer near these contact points.

In accordance with one or more examples of the present disclosure, apparatus and techniques for melt infiltration of CMC components may address these and other problems. The disclosed apparatus for melt infiltration includes a crucible configured to contain a volume of molten silicon that infiltrates the CMC component during a melt infiltration process. The crucible is selectively sized and dimensioned such that the volume of molten silicon fills the crucible to designed liquid level in the crucible. The apparatus includes a first stabilizer configured to mechanically support the CMC component from a first side and a second stabilizer configured to mechanically support the CMC component from a second side opposite the first side. The first stabilizer and the second stabilizer suspend the CMC component above the liquid level during the melt infiltration process. In this way, the CMC component is suspended above the liquid level during the entire melt infiltration process, and defects resulting from immersion of the CMC component into the molten silicon may be reduced or eliminated.

Furthermore, in some examples, the first stabilizer and the second stabilizer may contact sacrificial portions of the CMC component. The sacrificial portions of the CMC component are intended to be removed from the CMC component after the melt infiltration process. In this way, "scarring" defects related to contact between the CMC component and supporting tooling during the melt infiltration process may be reduced or eliminated.

The disclosed crucible defines a bottom. A plurality of molten silicon transport structures are disposed between the bottom of the crucible and the CMC component. The plurality of molten silicon transport structures are configured to transport the molten silicon to the CMC component for infiltration into the CMC component during the melt infiltration process. For example, the plurality of molten silicon transport structures may include at least three substructures, and the three substructures may include a felt substructure, a wick substructure, and a coupling substructure. The plurality of molten silicon transport structures may work together to transport all or nearly all of the molten silicon from the crucible into the CMC component. In this way, the disclosed apparatus and techniques may advantageously allow for completely infiltrating and densifying the CMC component with molten silicon without excess silicon remaining that can cause defects on the component surface. Accordingly, apparatus and techniques disclosed herein may allow for reduced energy and material costs, and may increase the quality with which CMC components may be fabricated.

In accordance with one or more examples of the present disclosure, a melt infiltration apparatus for a ceramic matrix composite (CMC) component includes a crucible. The crucible is configured to contain a volume of molten silicon that infiltrates the CMC component during a melt infiltration process. The volume of molten silicon fills the crucible to a defined liquid level in the crucible. The apparatus includes a first stabilizer configured to mechanically support the CMC component from a first side and a second stabilizer configured to mechanically support the CMC component from a second side opposite the first side. The first stabilizer and the second stabilizer are configured to suspend the CMC component above the liquid level during the melt infiltration process.

In accordance with one or more examples of the present disclosure, a melt infiltration apparatus for a ceramic matrix composite (CMC) component includes a crucible. The crucible defines a bottom and is configured to contain a volume of molten silicon that infiltrates the CMC component during a melt infiltration process. The apparatus includes a plurality of molten silicon transport structures disposed between the bottom of the crucible and the CMC component. The plurality of molten silicon transport structures are configured to transport the molten silicon to the CMC component for infiltration into the CMC component during the melt infiltration process.

In accordance with one or more examples of the present disclosure, a method for melt infiltrating a ceramic matrix composite (CMC) component includes containing a volume of molten silicon in a crucible. The crucible defines a bottom, and the CMC component is suspended over the bottom. The method includes transporting the molten silicon to the CMC component through a plurality of molten silicon transport structures disposed between the bottom of the crucible and the CMC component and melt infiltrating the CMC component with the molten silicon.

The details of one or more examples are set forth in the accompanying drawings and the description below. Other features, objects, and advantages will be apparent from the description and drawings, and from the claims.

DETAILED DESCRIPTION

Figure 1:
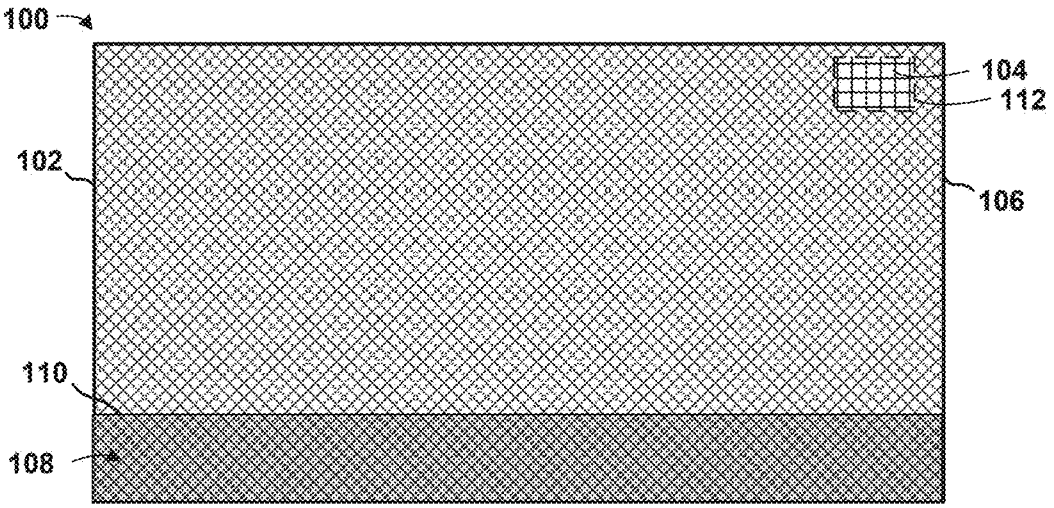
FIGS. 1-3 are conceptual diagrams illustrating example CMC components following melt infiltration.

The disclosure describes apparatus and techniques for melt infiltrating a ceramic matrix composite (CMC) component. Ceramic matrix composite (CMC) components are well-suited for high-temperature mechanical systems because of their toughness, thermal resistance, high temperature strength, chemical stability, and light weight relative to components made from other materials. For these reasons, CMC components may be used in gas turbine engines. Some example applications include blades, vanes, blade tracks, seal segments, combustor liners, stiffeners, and other components.

CMC components may include ceramic fibers embedded in a ceramic matrix. The ceramic fibers may include a continuous or discontinuous reinforcement material such as a monofilament or multifilament weave of ceramic fibers. To fabricate the CMC component, the ceramic fibers may be shaped into a ceramic fiber preform. The ceramic matrix may be infiltrated into the ceramic fiber preform to fill in gaps within the ceramic fiber preform and densified to create the CMC component with ceramic fibers embedded in a ceramic matrix.

The ceramic matrix may be generated in a series of steps. For example, one or more layers may be built up on the ceramic fibers by a chemical vapor infiltration (CVI) and/or chemical vapor deposition (CVD) step. A slurry infiltration step may infiltrate a slurry containing carbon and/or silicon carbide into the preform. A melt infiltration step may infiltrate the CMC component with molten silicon. The silicon metal may combine with carbon to create a silicon carbide matrix between the ceramic fibers, and may be hardened to create a dense CMC component.

Before the melt infiltration step, the CMC component may contain a plurality of voids between the ceramic fibers. The voids, in total, may be referred to as the void volume of the CMC component. During the melt infiltration step, it may be desirable to completely infiltrate and fill the void volume of the CMC component with molten silicon. However, using excess molten silicon during melt infiltration may not be desirable, because excess molten silicon may lead to deleterious defects on the CMC component. For example, certain melt infiltration apparatus and techniques may immerse all or part of the CMC component in the molten silicon during melt infiltration. Immersion of the CMC component in the molten silicon may lead to excess silicon or silicon-containing ceramic built up as a surface nodule on the surface of the CMC component. Furthermore, in examples where only a portion of the CMC component is immersed in the molten silicon, an undesirable defect may be detected on the surface of the CMC component at the interface between the portion of the CMC component that was submerged in the molten silicon and the portion of the CMC component that was not submerged in the molten silicon. Accordingly, the component surface of the CMC component may be non-uniform.

Additionally, certain melt infiltration apparatus and techniques may mechanically support the CMC component during the melt infiltration with tooling. In these certain examples, the points or areas where the tooling contacts the CMC component may exhibit defects due to reduced infiltration in the area and/or underbuilding or overbuilding of the ceramic matrix on the component surface near these contact points.

In accordance with one or more examples of the present disclosure, apparatus and techniques for melt infiltration of CMC components may address these and other problems. The disclosed apparatus for melt infiltration includes a crucible configured to contain a volume of molten silicon that infiltrates the CMC component during a melt infiltration process. The crucible is selectively sized and dimensioned such that the volume of molten silicon fills the crucible to a designed liquid level in the crucible. Sizing the crucible in the way may advantageously improve the quality of melt infiltration and allow for production increases by maximizing the number of components that may be infiltrated in a given run or shift. The apparatus includes a first stabilizer configured to mechanically support the CMC component from a first side and a second stabilizer configured to mechanically support the CMC component from a second side opposite the first side. The first stabilizer and the second stabilizer suspend the CMC component above the liquid level during the melt infiltration process. In this way, the CMC component is suspended above the liquid level during the entire melt infiltration process, and defects resulting from immersion of the CMC component into the molten silicon may be reduced or eliminated.

In some examples, the crucible may be selectively dimensioned for melt infiltration of a particular CMC component. The crucible may be sized to contain a particular volume of molten silicon that fills the void volume such that the CMC component is fully infiltrated and densified by the volume of molten silicon without excess molten silicon in the crucible that builds up and/or creates defects on the surface of the CMC component (e.g., as silicon nodules). For example, the CMC component may be a blade, a vane, a seal segment, or the like, with particular dimensions and a particular ceramic fiber preform void volume. Rather than techniques which immerse the component in a pool of molten silicon, apparatus and techniques of the present disclosure may suspend the CMC component over a calculated amount of molten silicon approximately equal to the void volume of the CMC component (e.g., plus or minus 30 percent of the void volume, or plus or minus 20 percent of the void volume, or plus or minus 10 percent of the void volume). The molten silicon may fully infiltrate and fill the void volume of the CMC component without excess molten silicon building up on the component surface.

In some examples, the crucible may define a liquid level for the volume of molten silicon. For example, a fill line (e.g., a groove or the like) may indicate to an operator the level to which the crucible should be filled. Additionally, or alternatively, one or more overflow ports may be positioned on the crucible wall such that the crucible may be filled with the correct amount of molten silicon and no more.

In some examples, the first stabilizer and the second stabilizer may suspend the entire CMC component above the liquid level during the melt infiltration. As such, no portion of the CMC component may be immersed in the molten silicon during the melt infiltration.

Supporting the entire CMC component above the molten silicon bath during melt infiltration in this way may advantageously reduce or eliminate buildup of silicon nodules on any part of the CMC component.

The CMC component may be supported above the liquid level of the molten silicon in any suitable way. For example, the first stabilizer and/or the second stabilizer may include a base extending from the liquid level, such that the base extends through the molten silicon and the first stabilizer and/or the second stabilizer mechanically support the CMC component above the liquid level. In other examples, the first stabilizer and/or the second stabilizer may be mounted to an inner wall of the crucible above the liquid level. In these examples, the first stabilizer or the second stabilizer may include a mortise and the inner wall of the crucible may include a tenon. The tenon may be inserted into the mortise to mount the stabilizer to the crucible above the liquid level.

Furthermore, in some examples, the first stabilizer and the second stabilizer may contact the CMC component to mechanically support the CMC component during melt infiltration at particular contact points. In some examples, the first stabilizer and/or the second stabilizer may be selectively tailored to contact sacrificial portions of the CMC component. The sacrificial portions of the CMC component may be protrusions on the CMC component intended to be removed from the CMC component after the melt infiltration process. In this way, "scarring" defects related to contact between the CMC component and supporting tooling during the melt infiltration process may be reduced or eliminated.

The disclosed crucible defines a bottom. A plurality of molten silicon transport structures is disposed between the bottom of the crucible and the CMC component. The plurality of molten silicon transport structures are configured to transport the molten silicon to the CMC component for infiltration into the CMC component during the melt infiltration process. In some examples, the plurality of molten silicon transport structures may include at least three substructures, and the three substructures may include a felt substructure, a wick substructure, and a coupling substructure. The plurality of molten silicon transport structures may work together to transport all or nearly all of the molten silicon from the crucible into the CMC component during the melt infiltration. Since the crucible does not contain a large amount of excess silicon, it may be important to transport all or nearly all (e.g., 80 percent or more, or 90 percent or more) of the molten silicon to the CMC component. In this way, the disclosed apparatus and techniques may advantageously allow for completely infiltrating and densifying the CMC component with molten silicon without excess silicon remaining that can cause defects on the surface of the CMC component. Other melt infiltration apparatus and techniques, which may only partially infiltrate (e.g., partially fill void volumes with molten silicon), may cause defects or require re-processing. Accordingly, apparatus and techniques disclosed herein may allow for reduced energy and material costs, and may increase the quality with which CMC components may be fabricated.

Each substructure of the plurality of molten silicon transport structures may serve a particular function. For example, the plurality of molten silicon transport structures may include at least three substructures including a first substructure, a second substructure, and a third substructure. Where the plurality includes three substructures, the first substructure may be a pliable felt positioned in the bottom of the crucible which completely covers the bottom of the crucible. The first substructure may transport the molten silicon from the corners of the crucible to the second substructure as the crucible empties during melt infiltration. As such, inclusion of the first substructure may ensure that all or nearly all of the melted silicon is infiltrated into the CMC component.

The second substructure may be a wick substructure configured to transport the molten silicon by capillary action from the liquid level of molten silicon to the CMC component. In some examples, the second substructure may be a rigid graphite mesh layer. As such, inclusion of the second substructure may allow for further mechanical support of the CMC component and suspension of the CMC component above the molten silicon, because the molten silicon is transported to the CMC component at least partially by capillary action through the second substructure.

In examples where the plurality of molten silicon transport structures includes three substructures, the third substructure may include a coupling substructure. The third substructure may be disposed adjacent to the CMC component and may function to increase an infiltration rate of the molten silicon into the CMC component by increasing a surface area of contact between the plurality of molten silicon transport structures and the CMC component. For examples, the second substructure, as mentioned, may be a rigid graphite mesh, and the CMC component may be a ceramic fiber preform. As such, the mesh of the second substructure and the fibers of the CMC component may have only a relatively small surface area for melt infiltration relative to two surfaces with perfect contact at the interface. The third substructure may increase the rate of melt infiltration by increasing the surface area of contact. In some examples, the third substructure may be a powder, such as a silicon carbide powder, another ceramic powder, or a combination of ceramic powders. The powder of the third substructure may be sprinkled onto the second substructure, settling into depressions of the second substructure and improving contact between the plurality of molten silicon transport structures and the CMC component. Additionally, or alternatively, the powder may be applied via a powder bed. As such, inclusion of the third substructure may advantageously lead to a more quick and complete melt infiltration process.

FIG. 1 is a conceptual diagram illustrating example CMC component 100 after a melt infiltration process. CMC component 100 includes substrate 102. Substrate 102 may be all or a portion of a component of a high-temperature mechanical system, such as a gas turbine engine component including a blade, a vane, a seal segment, a stiffener, or other component. In a particular example, CMC component 100 may be a high-pressure seal segment.

CMC component 100 includes ceramic fibers 104. Ceramic fibers 104 are schematically illustrated within window 112 in FIG. 1, although ceramic fibers 104 are embedded in a ceramic matrix following the melt infiltration process. The ceramic material of ceramic fibers 104 and/or the ceramic matrix may include any useful ceramic material, including, for example, silicon carbide, silicon nitride, alumina, silica, and the like. Ceramic fibers 104 may include a continuous reinforcement or a discontinuous reinforcement. For example, ceramic fibers 104 material may include discontinuous whiskers, platelets, or particulates. In some examples, ceramic fibers 104 may include a continuous monofilament or multifilament weave, as illustrated. Ceramic fibers 104 may be shaped into a ceramic fiber preform, which may be made of stacked plies, or two-dimensional sheets of ceramic fibers 104 formed into a three-dimensional shape.

Ceramic fibers 104 may be embedded in a ceramic matrix. The ceramic matrix may be generated in a series of steps. For example, one or more layers may be built up on the ceramic fibers by a chemical vapor infiltration (CVI) and/or chemical vapor deposition (CVD) step. A slurry infiltration step may infiltrate a slurry containing carbon and/or silicon carbide into the preform. Melt infiltration may infiltrate CMC component 100 with molten silicon. The silicon metal may combine with carbon to create a silicon carbide matrix between ceramic fibers 104, and may be hardened to create dense CMC component 100 with component surface 106 of hardened ceramic material.

In some examples, the ceramic matrix composition may be the same as the composition of ceramic fibers 104. For example, a silicon carbide matrix may surround silicon carbide fibers. In other examples, the ceramic matrix material may include a different composition than ceramic fibers 104, such as mullite fibers in an alumina matrix, or the like. In one example, CMC component 100 includes silicon carbide continuous ceramic fibers embedded in a silicon carbide matrix.

Before the melt infiltration step, CMC component 100 may contain a plurality of voids between ceramic fibers 104. The voids, in total, may be referred to as the void volume of CMC component 100. During the melt infiltration step, it may be desirable to completely infiltrate and fill the void volume of CMC component 100 with molten silicon. However, using excess molten silicon during melt infiltration may not be desirable, because excess molten silicon may lead to deleterious defects on CMC component 100, as shown in FIG. 1. For example, certain melt infiltration apparatus and techniques may immerse all or a part of CMC component 100 in the molten silicon during melt infiltration. Immersion of the CMC component 100 in the molten silicon may lead to excess silicon or silicon-containing ceramic built up as silicon nodules 108 on the surface of CMC component 100. Silicon nodules 108 may be excess silicon on component surface 106, which may cause component surface 106 to exhibit a non-uniform finish. Furthermore, silicon nodules 108 may cause buildup beyond the specified dimensions of CMC component 100. Furthermore, in examples where only a portion of CMC component 100 is immersed in the molten silicon, as illustrated, immersion line 110 may appear on the surface CMC component 100 at the interface between the portion of CMC component 100 that was submerged in the molten silicon (e.g., the darker bottom portion of FIG. 1 where silicon nodules 108 are present) and the portion of CMC component 100 that was not submerged in the molten silicon (e.g., the lighter top portion of FIG. 1), which may have a relatively thin layer of ceramic matrix at component surface 106. A melt infiltration apparatus and process that results in CMC component 100 of FIG. 1 may not be desirable because, for example, silicon nodules 108 may cause CMC component 100 to have one or more dimensions that fall outside a specification window for CMC 100, or lack uniformity in visual appearance, or material properties that differ from expected material properties, or the like.

Figure 2:
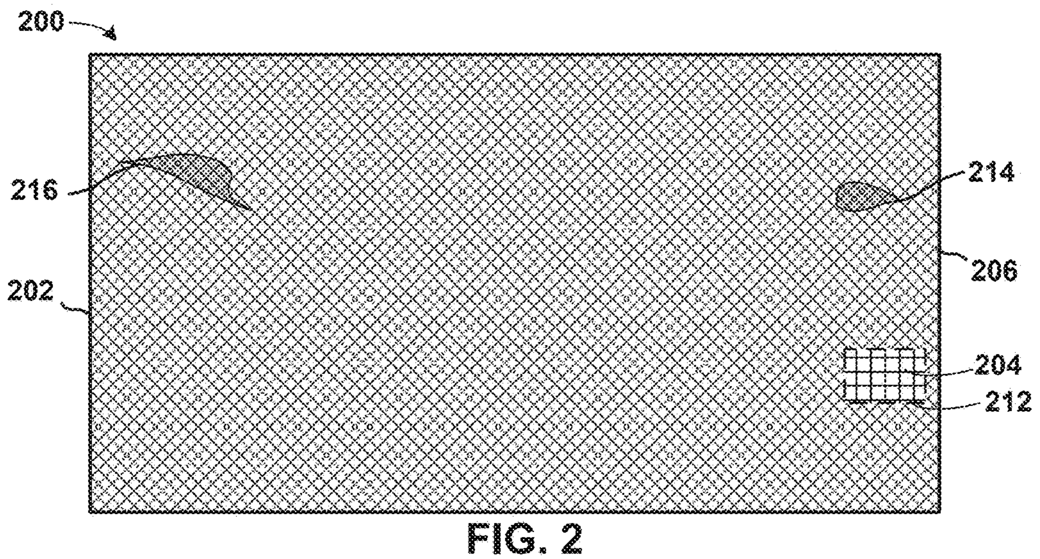

FIG. 2 is a conceptual diagram illustrating example CMC component 200 after a melt infiltration process. CMC component 200 may be an example of CMC component 100 of FIG. 1, where similar reference numerals indicate similar elements. After melt infiltration, CMC component 200 includes contact blemishes 214, 216. Contact blemishes 214, 216 are areas on the surface of CMC component 200 that are non-uniform with the rest of the surface layer 206 of CMC component 200. In some examples, contact blemishes 214, 216 may be depressions or protrusions on component surface 206 of CMC component 200 that appear visually different from the remainder of component surface 206.

Certain melt infiltration apparatus or techniques may cause contact blemishes 214, 216 during a melt infiltration process where portions of the melt infiltration apparatus contact CMC component 200. For example, where contact blemishes 214, 216 are depressions in component surface 206, contact blemishes 214, 216 may be caused by interruption of the formation of component surface 206 on areas of CMC component 200 that are contacted by the tooling and support apparatus of the melt infiltration apparatus. Where contact blemishes 214, 216 are depressions, the reduced ceramic material present on component surface 206 may reduce the strength of component 200, and/or may expose CMC component 200 to oxidation, and/or may cause the dimensions to CMC component to fall outside a specified range. Additionally, or alternatively, in some cases, contact blemishes 214, 216 may be areas where extra ceramic material is present, similar to silicon nodules 108 of FIG. 1. For example, molten silicon may buildup at contact points where tooling touches CMC component 200 during melt infiltration. Where contact blemishes 214, 216 are protrusions on CMC component 200, the protrusions may cause CMC component 200 to have dimensions that fall outside the specified range. As such, a melt infiltration apparatus and process that results in CMC component 200 of FIG. 2 may not be desirable.

Certain melt infiltration apparatus and techniques may result in silicon nodules 108 of FIG. 1, which may be called "scuzz." As described above, silicon nodules 108 may be caused by immersion of at least a part of the CMC component in molten silicon or silicon slurry (e.g., a slurry containing silicon and one or more other components). Certain melt infiltration apparatus and techniques may result in contact blemishes 214, 216 of FIG. 2, which may be called "scarring." As described above, contact blemishes 214, 216 may be caused by contact between the melt infiltration apparatus and the CMC component during the melt infiltration. Some melt infiltration apparatus and techniques may cause both silicon nodules 108 of FIG. 1 and contact blemishes 214, 216 of FIG. 2.

Figure 3:
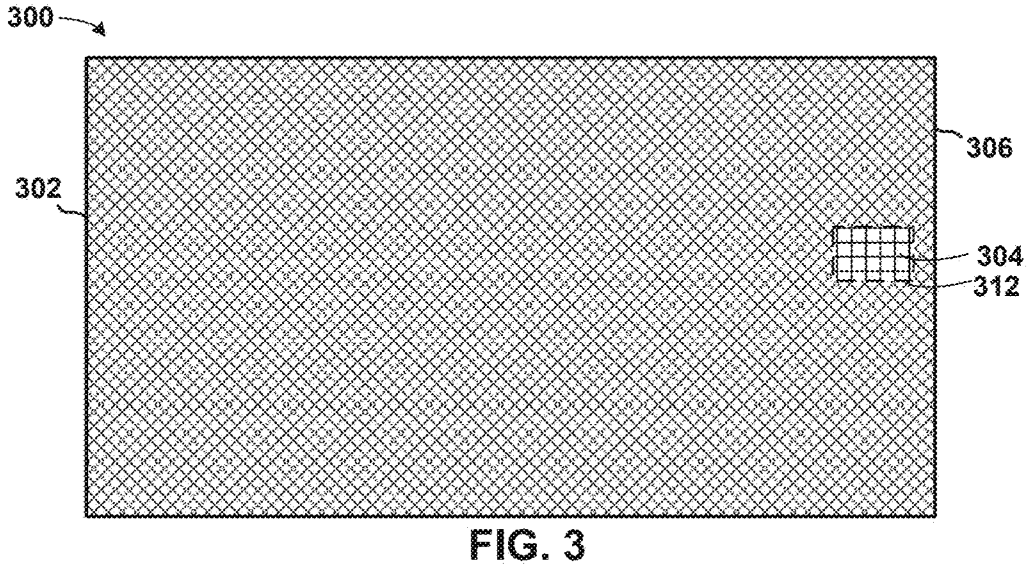

FIG. 3 illustrates example CMC component 300. CMC component 300 may be formed by melt infiltration apparatus and techniques according to the present disclosure, unlike CMC component 100 of FIG. 1 and CMC component 200 of FIG. 2. CMC component 300 includes substrate 302, which includes ceramic fibers 304 (schematically illustrated in window 312) embedded in ceramic material. As illustrated, component surface 306 of CMC component 300 may be relatively uniform (e.g., visually uniform and/or uniform in roughness and/or uniform in thickness). As such, CMC component 300, as formed by melt infiltration apparatus and techniques of the current disclosure, may be more desirable than CMC component 100 of FIG. 1 or CMC component 200 of FIG. 2, which are formed by other melt infiltration apparatus and techniques, because CMC component 300 may be relatively more uniform in appearance and dimensions than CMC components formed by other apparatus and techniques.

Figure 4:
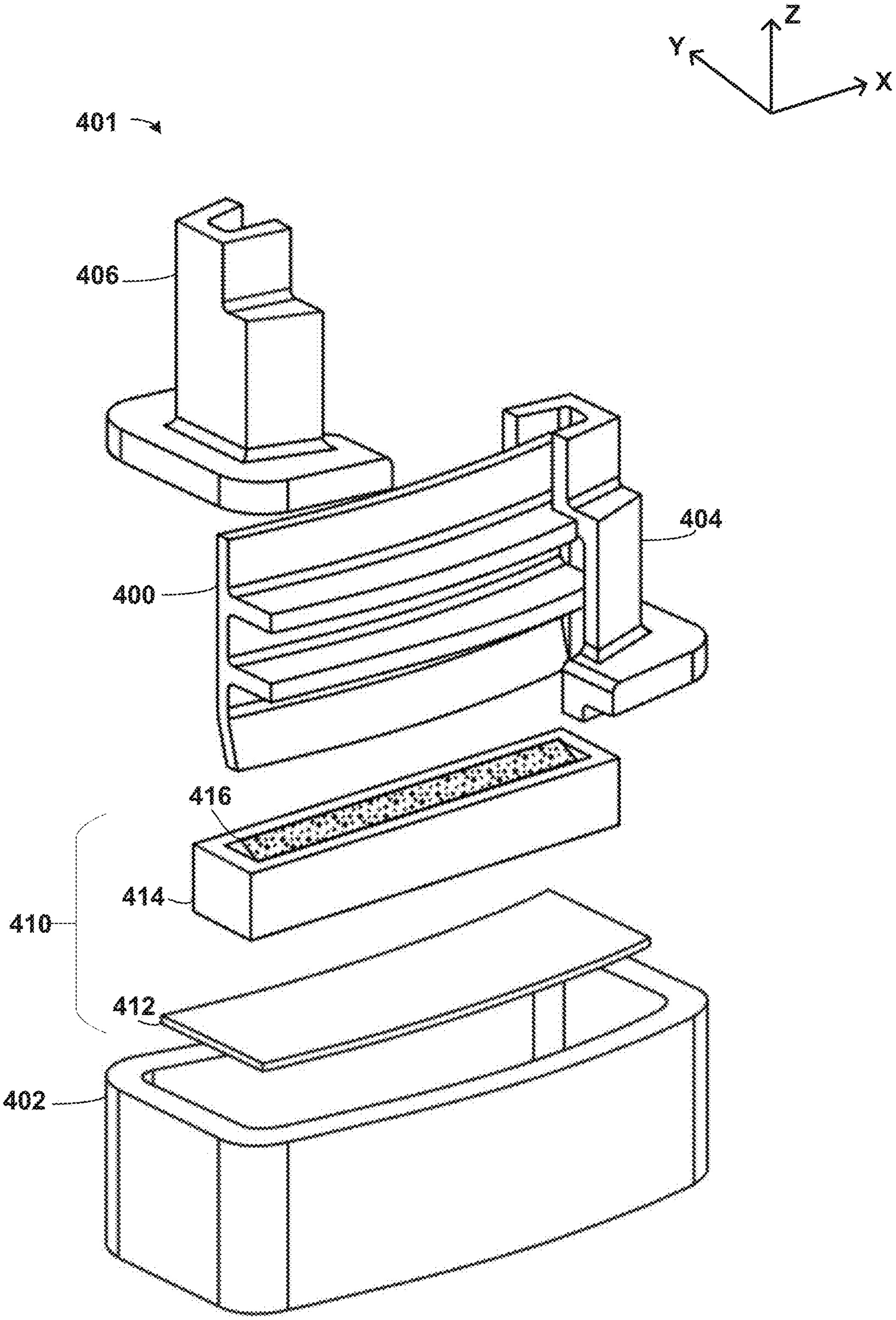
FIG. 4 is a conceptual perspective view of an example melt infiltration apparatus for a CMC component, in accordance with one or more examples of the present disclosure.

FIG. 4 is a conceptual perspective view of example melt infiltration apparatus 401 for CMC component 400, in accordance with one or more examples of the present disclosure. For example, melt infiltration apparatus 401 may be used to perform a melt infiltration that results in CMC component 400 having the features of CMC component 300 of FIG. 3. As such, CMC component 400 may be free or relatively free of the defects of CMC component 100 of FIG. 1 and/or the defects of CMC component 200 of FIG. 2.

Melt infiltration apparatus 401 includes crucible 402, first stabilizer 404, second stabilizer 406, and plurality of molten silicon transport structures 410. Crucible 402 contains a volume of molten silicon that infiltrates CMC component 400 during the melt infiltration. Crucible 402 may be selectively dimensioned to be filled such that the volume of molten silicon reaches a defined liquid level in the crucible, as will be further described below.

CMC component 400 may define a void volume before the melt infiltration. The volume of molten silicon contained by crucible 402, when filled to the defined liquid level, may be approximately equal to the void volume of CMC component 400. As such, melt infiltration apparatus 401 may be configured to contain a volume of molten silicon that fully infiltrates and densifies CMC component 400 without excess molten silicon remaining after the melt infiltration process.

Melt infiltration apparatus 401 includes first stabilizer 404 and second stabilizer 406. First stabilizer 404 mechanically supports CMC component 400 from a first side. Second stabilizer 406 mechanically supports CMC component 400 during melt infiltration from a second side opposite the first side. First stabilizer 404 and second stabilizer 406 suspend CMC component 400 above the liquid level of the molten silicon during the melt infiltration process. In some examples, first stabilizer 404 and second stabilizer 406 may suspend the entire CMC component 400 above the liquid level during the melt infiltration process. In this way, melt infiltration apparatus 401 may reduce or eliminate silicon nodules 108 of FIG. 1, and may form CMC component 400 without defects related to immersion in molten silicon.

In some examples, first stabilizer 404 and second stabilizer 406 may contact a sacrificial portion of CMC component 400. Sacrificial portions of CMC component may be protrusions or other features on CMC component 400 that are configured to be removed by a machining process after the melt infiltration. In this way, melt infiltration apparatus 401 may reduce or eliminate contact blemishes 214, 216 of FIG. 2, and may form CMC component 400 without defects related to contact with tooling or mechanical support systems.

Melt infiltration apparatus 401 includes plurality of molten silicon transport structures 410. Plurality of molten silicon transport structures 410 transport the molten silicon to CMC component 400 for infiltration into CMC component 400 during the melt infiltration process. In some examples, plurality of molten silicon transport structures 410 may be configured to transport molten silicon to CMC component 400 by capillary action. In some examples, the entire CMC component 400 is suspended above the liquid level of molten silicon. The molten silicon must travel through at least a portion of the plurality of molten silicon transport structures to contact CMC component 400. In this way, plurality of molten silicon transport structures 410 may provide a pathway for infiltration of molten silicon into CMC component 400 without immersing CMC component 400 in the molten silicon.

In some examples, plurality of molten silicon transport structures 410 may include first substructure 412, second substructure 414, and third substructure 416. First substructure 412 may be a felt disposed adjacent to a bottom of crucible 402. First substructure 412 may completely cover the bottom of the crucible and transport the molten silicon to second substructure 414 from the corners of crucible 402 as the molten silicon infiltrates CMC component 400. In some examples, first substructure 412 may be a pliable felt.

Second substructure 414 may be a wick disposed between first substructure 412 and third substructure 416. Second substructure 414 may transport molten silicon out of the crucible bath to CMC component 400 by capillary action. In some examples, second substructure 414 may be a graphite mesh.

Third substructure 416 may be a coupling layer disposed adjacent to CMC component 400 on top of second substructure 414. In some cases, third substructure 416 may increase an infiltration rate of the molten silicon into CMC component 400 by increasing a surface area of contact between plurality of molten silicon transport structures 410 and CMC component 400. In some examples, third substructure 416 may be a powder. Third substructure 416 may be a silicon carbide powder, which may be sprinkled onto second substructure 414.

Figure 5A:
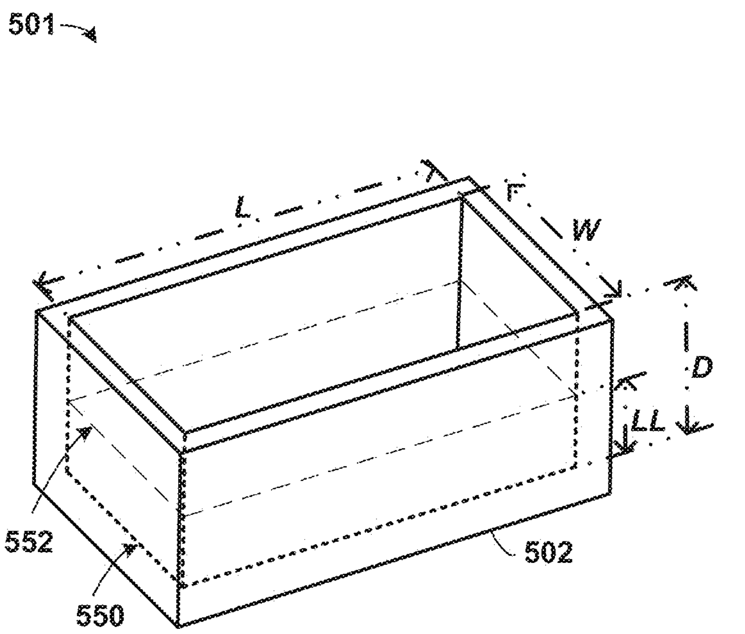
FIG. 5A is a conceptual perspective view illustrating an example crucible in accordance with one or more examples of the present disclosure.
Figure 5B:
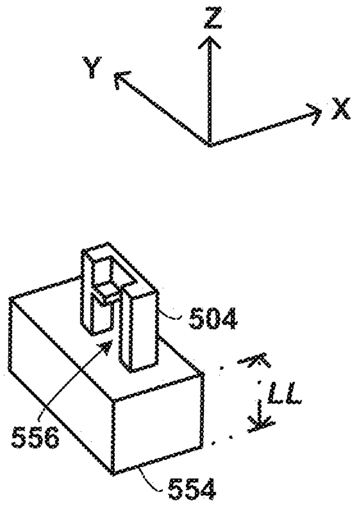
FIG. 5B is a conceptual perspective view illustrating an example stabilizer for use with the crucible of FIG. 5A.

FIGS. 5A-5B are conceptual perspective views illustrating portions of example melt infiltration apparatus 501. FIG. 5A is a conceptual perspective view illustrating crucible 502, with hidden features illustrated by broken lines. FIG. 5B is a conceptual perspective view illustrating example stabilizer 504 for use with crucible 502 of FIG. 5A. Crucible 502 may be an example of crucible 402 of melt infiltration apparatus 401 of FIG. 4. Stabilizer 504 may be an example of first stabilizer 404 or second stabilizer 406 of melt infiltration apparatus 401 of FIG. 4.

Crucible 502 is configured to contain a volume of molten silicon for infiltration into a CMC component. In some examples, the volume of molten silicon may be approximately equal to the void volume in the CMC component. Relative to other melt infiltration techniques which may use excess silicon, crucible 502 may be selectively tailored to reduce excess ceramic material (e.g., silicon nodules 108 of FIG. 1) from building up on the CMC component by containing only the molten silicon necessary to completely infiltrate the CMC component.

Crucible 502 may define length L, width W, and depth D. In combination with the volume of molten silicon necessary to completely infiltrate the CMC component without excess silicon, the dimensions of crucible 502 may define a liquid level LL at molten silicon surface level 552, which may be displaced from bottom 550 of crucible 502. Stabilizer 504 may be matched to crucible 502 such that the CMC component is suspended over molten silicon surface level 552 at the commencement of the melt infiltration process. For example, stabilizer 504 may include base 554. Base 554 may define a height LL extends from bottom 550 to molten silicon surface level 552. Stabilizer 504 may define a recess 556 configured to receive and mechanically support the CMC component from a first side, or from a second, opposite side.

Figure 6A:
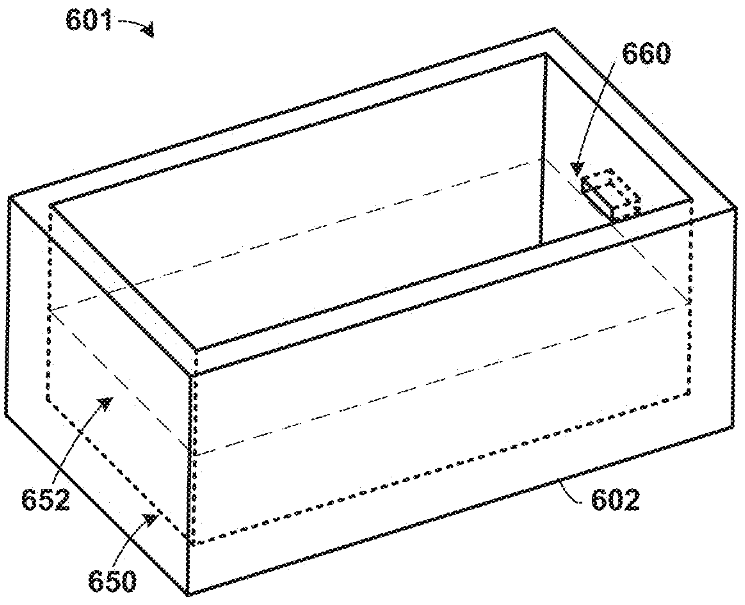
FIG. 6A is a conceptual perspective view illustrating an example crucible in accordance with one or more examples of the present disclosure.
Figure 6B:
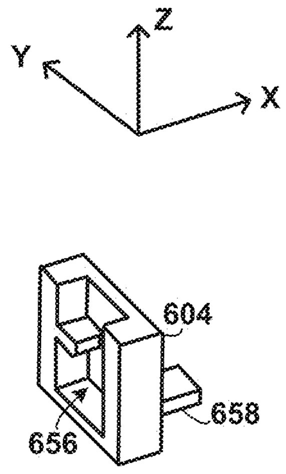
FIG. 6B is a conceptual perspective view illustrating an example stabilizer for use with the crucible of FIG. 6A.

FIGS. 6A-6B are conceptual perspective views illustrating portions of example melt infiltration apparatus 601. FIG. 6A is a conceptual perspective view illustrating crucible 602, with hidden features illustrated by broken lines. FIG. 6A is a conceptual perspective view illustrating example crucible 602. FIG. 6B is a conceptual perspective view illustrating example stabilizer 604 for use with crucible 602 of FIG. 6A. Crucible 602 may be an example of crucible 402 of melt infiltration apparatus 401 of FIG. 4. Stabilizer 604 may be an example of first stabilizer 404 or second stabilizer 406 of melt infiltration apparatus 401 of FIG. 4. Similar reference numerals indicate similar elements. Crucible 602 and stabilizer 604 may be generally described similarly to crucible 502 and support member 504, differing as described below.

In some examples, rather than or in addition to a base extending from the bottom of the crucible to the liquid level, stabilizer 604 may be configured to be mounted to an inner wall of crucible 602 to suspend the CMC component above molten silicon surface 652. For example, stabilizer 604 may include tenon 658, and the inner wall of crucible 602 may include mortise 660. Tenon 658 may be inserted into mortise 660 to mount stabilizer 604, although other mounting systems may also be applied. In some examples, mortise 660 may be defined by crucible 602 at or above molten silicon surface level 652. In this way, stabilizer 604 may suspend the CMC component above the liquid level during melt infiltration. Mounting stabilizer 604 to crucible 602, as illustrated, may enable relatively quick removal of stabilizer 604 from crucible 602 for changing or adjustment of the CMC component. Furthermore, stabilizer 604 may displace relatively little molten silicon of the volume of molten silicon, and may reduce buildup on stabilizer 604 by locating stabilizer 604 above the liquid level of molten silicon.

Figure 7:
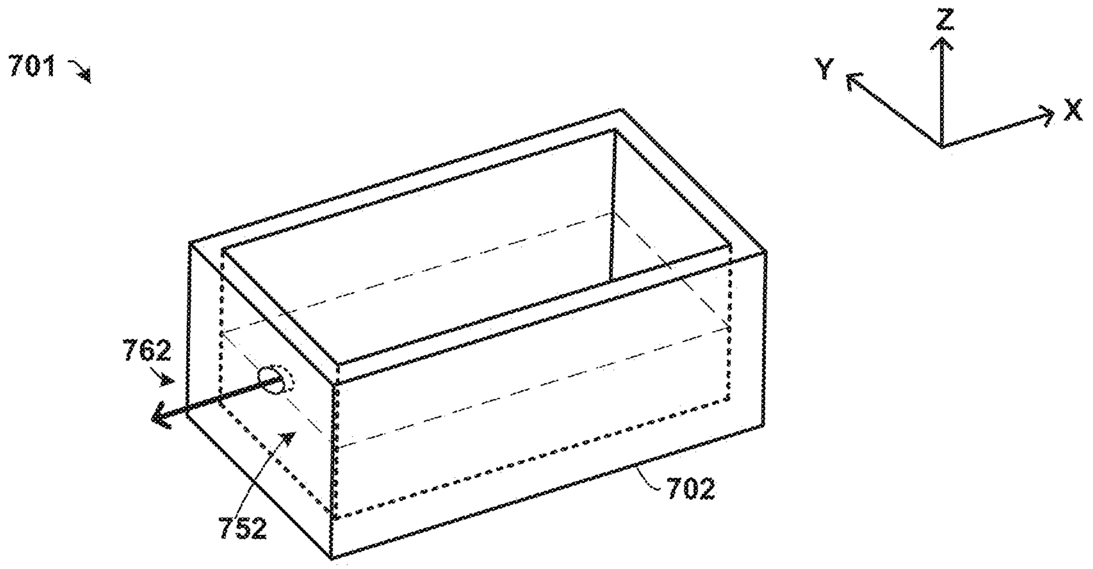
FIG. 7 is a conceptual perspective view illustrating an example crucible in accordance with one or more examples of the present disclosure.

FIG. 7 is a conceptual perspective view illustrating crucible 702 of melt infiltration apparatus 701. Crucible 702 may be an example of crucible 402 of melt infiltration apparatus 401 of FIG. 4, or of crucible 502 of FIG. 5A, or of crucible 602 of FIG. 6A. Similar reference numerals indicate similar elements. Crucible 702 may be generally described similarly to crucible 402, crucible 502 and/or crucible 602, differing as described below.

Crucible 702 includes overflow port 762. Overflow port 762 is an aperture defined in crucible 702 at molten silicon surface level 752. Overflow port 762 may prevent crucible 702 from being overfilled above the molten silicon surface level 752 (as illustrated by the arrow exiting overflow port 762). In this way, crucible 702 may define the volume of molten silicon that is used in the melt infiltration process, because an operator may fill crucible 702 with molten silicon until the molten silicon flows out from overflow port 762.

Figure 8:
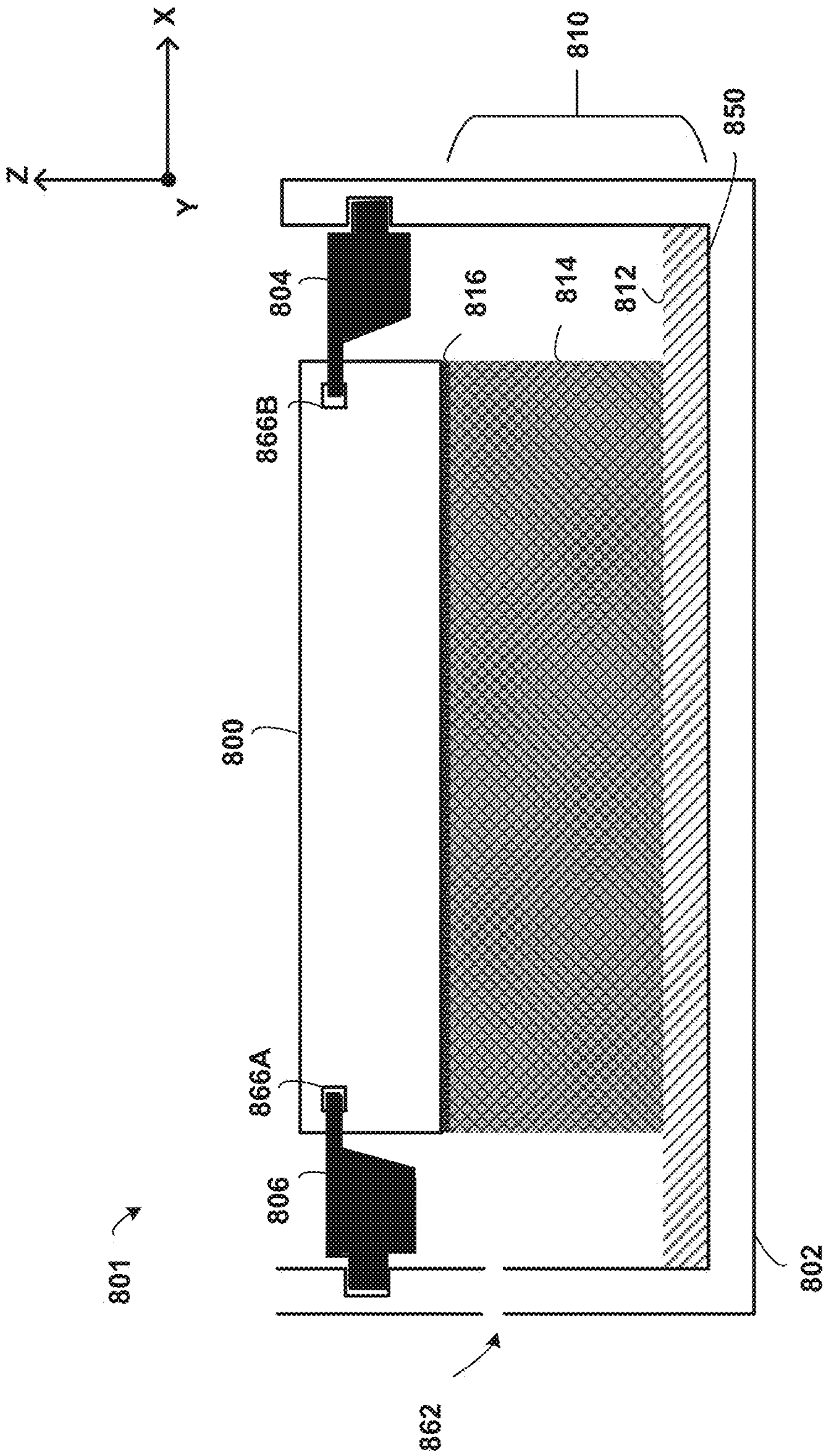
FIG. 8 is a side view conceptual diagram illustrating an example melt infiltration apparatus in accordance with the present disclosure, illustrating a plurality of molten silicon transport structures disposed between the bottom of the crucible and the CMC component.

FIG. 8 is a side view conceptual diagram illustrating melt infiltration apparatus 801 from a conceptual side view. Melt infiltration apparatus 801 may be an example of melt infiltration apparatus 401 of FIG. 4, melt infiltration apparatus 501 of FIGS. 5A-5B, melt infiltration apparatus 601 of FIGS. 6A-6B, or melt infiltration apparatus 701 of FIG. 7, where similar reference numerals indicate similar elements. Melt infiltration apparatus 801 is configured to mechanically support CMC component 800 during melt infiltration.

Melt infiltration apparatus 801 includes crucible 802. Crucible 802 includes overflow port 862. As such, the volume of molten silicon filling crucible 802 may be defined by the displacement of overflow port 862 from bottom 850 of crucible 802. First stabilizer 804 and second stabilizer 806 mechanically support CMC component 800 above the liquid level, as described above.

CMC component 800 may define one or more sacrificial portions 866A, 866B. Sacrificial portions 866A, 866B are located where first stabilizer 804 and second stabilizer 806 contact and mechanically support CMC component 800. Sacrificial portions 866A, 866B may be formed by the ceramic fibers of the ceramic fiber preform, for example as a protrusion not intended to be part of the final dimensions of CMC component 800. Sacrificial portions 866A, 866B may be the parts of CMC component 800 that receive contact blemishes 214, 216 of FIG. 2. Sacrificial portions 866A, 866B may be removed after the melt infiltration process, thereby eliminating the contact blemishes.

Melt infiltration apparatus 801 may include plurality of molten silicon transport structures 810. Molten silicon transport structures 810 may transport molten silicon from crucible 802 to CMC component 800 during melt infiltration. As the liquid level drops throughout the melt infiltration process because molten silicon is infiltrated into CMC component 800, plurality of molten silicon transport structures 810 may continue to transport molten silicon to CMC component 800 until substantially all of the molten silicon is transported to CMC component 800. In this way, CMC component 800 may be completely infiltrated (e.g. all or nearly all of the void volume of CMC component 800 is filled with molten silicon). Plurality of molten silicon transport structures 810 may further reduce excess molten silicon remaining after the melt infiltration, because plurality of molten silicon transport structures 810 transport the molten silicon to CMC component 800 even as crucible 802 empties during later stages of the melt infiltration process.

Plurality of molten silicon transport structures 810 may include individual substructures, with each respective substructure performing a particular function during melt infiltration. Although illustrated as three substructures, in some cases plurality of molten silicon transport structures 810 may include fewer than three or more than three substructures. In some examples, plurality of molten silicon transport structures 810 may include first substructure 812, second substructure 814, and third substructure 816.

First substructure 812 may be a felt disposed adjacent to bottom 850 of crucible 802. First substructure 812 may completely cover bottom 850 of crucible 802 and transport the molten silicon to second substructure 814 from the corners of crucible 802 as the molten silicon infiltrates CMC component 800. In some examples, first substructure 812 may include a pliable felt. Forming first substructure from a pliable felt may allow for first substructure 812 to conform to bottom 850 of crucible 802, which may allow for the molten silicon to be more completely transported to second substructure 814 without puddling and remaining at bottom 850 of crucible 802.

Second substructure 814 may be a wick disposed between first substructure 812 and third substructure 816. Second substructure 814 may transport the molten silicon to CMC component 800 by capillary action. For example, second substructure 814 may be a graphite mesh. Forming second substructure 814 from a graphite mesh may have one or more advantages. For example, graphite mesh may include void areas where the molten silicon may travel through second substructure 814. Furthermore, second substructure 814 may be rigid, and may assist in mechanically supporting component 800 during melt infiltration. Additionally, graphite mesh may be temperature resistant enough to withstand the relatively high temperatures of melt infiltration.

Third substructure 816 may be a coupling layer disposed adjacent to CMC component 800 over second layer 814. In some examples, third substructure 816 may increase an infiltration rate of the molten silicon into CMC component 800 by increasing a surface area of contact between plurality of molten silicon transport structures 810 and CMC component 800. For example, where second substructure 814 is a mesh or otherwise textured or rough layer, third substructure 816 may be increase the contact area for interfacing between plurality of molten silicon transport structures 810 and CMC component 800. In some examples, third substructure 816 may be a powder. In some examples, the powder may include silicon carbide powder. In some examples, silicon carbide powder may be advantageous in increasing the rate of melt infiltration of CMC component 800.

In some examples, each substructure of plurality of molten silicon structures 810 may define a thickness. In some examples, second substructure 814 may define a thickness with a greater magnitude than either of first substructure 812 and third substructure 816. For example, second substructure 814 may define a thickness with a greater magnitude than first substructure 812 and third substructure 816 combined. In some examples, inclusion of a thicker second substructure 816 relative to other layers in the plurality of molten silicon transport structures 810 may increase the rate of melt infiltration relative to other arrangements.

As described above, first substructure 812 may completely cover bottom 850 of crucible 802 to improve transport of molten silicon to CMC component 800 during melt infiltration. In some examples, second substructure 814 may define a shorter length (X-direction of FIG. 8) and/or a shorter width (Y-direction of FIG. 8) than first substructure 812. For example, these dimensions of second substructure 814 may substantially match the dimensions of CMC component 800, which may advantageously reduce melt infiltration pathways that do not lead to CMC component 800. Arranging the dimensions of plurality of molten silicon transport structures 810 may improve the melt infiltration efficiency and rate.

Figure 9:
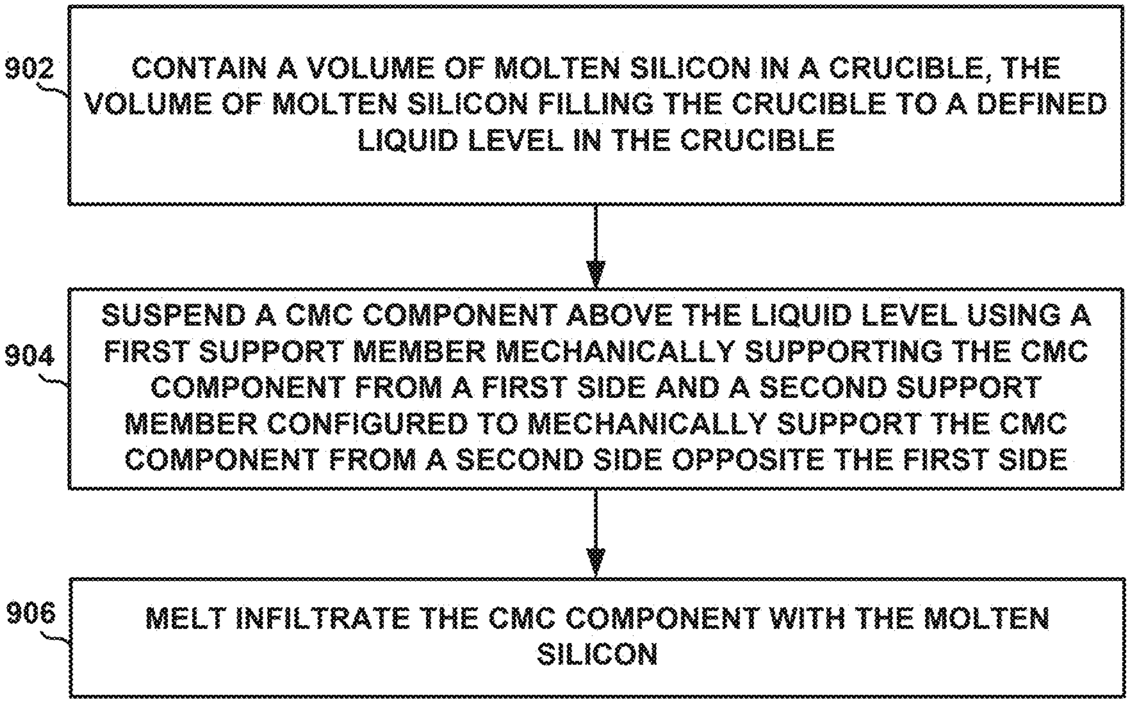
FIG. 9 is a flow diagram illustrating an example melt infiltration technique in accordance with one or more examples of the present disclosure.

FIG. 9 is a flow diagram illustrating an example melt infiltration technique for a CMC component in accordance with one or more examples of the present disclosure. The technique of FIG. 9 may be performed with melt infiltration apparatus 401 of FIG. 4, melt infiltration apparatus 501 of FIGS. 5A-5B, melt infiltration apparatus 501 of FIGS. 6A-6B, melt infiltration apparatus 701 of FIG. 7, or melt infiltration apparatus 801 of FIG. 8, although the described technique may be performed with other melt infiltration apparatus, and the described apparatus may be used to perform other techniques. The described technique may be executed to generate CMC component 300 of FIG. 3, rather than CMC component 100 of FIG. 1 or CMC component 200 of FIG. 2. The illustrated technique of FIG. 9 will be primarily described with concurrent reference to melt infiltration apparatus 401 of FIG. 4, melt infiltration apparatus 501 of FIGS. 5A-5B, melt infiltration apparatus 501 of FIGS. 6A-6B, melt infiltration apparatus 701 of FIG. 7, and melt infiltration apparatus 801 of FIG. 8.

With concurrent reference to FIGS. 5A and 5B, crucible 402 may contain a volume of molten silicon (902). The volume of molten silicon may fill crucible 502 to a defined liquid level LL, where the molten silicon surface level 552 is displaced from bottom 550 by a certain distance. With concurrent reference to FIG. 4, first stabilizer 404 and second stabilizer 406 may suspend CMC component 400 above molten silicon surface level (552, FIG. 5A) (904). First stabilizer 404 may mechanically support CMC component 400 from a first side, and second stabilizer 406 may mechanically support CMC component 400 from a second side opposite the first side. The technique of FIG. 9 may further include melt infiltrating CMC component 400 with the molten silicon (906). In some examples, melt infiltrating CMC component 400 may include transporting the molten silicon through plurality of molten silicon transport structures 410 to CMC component 400.

Figure 10:
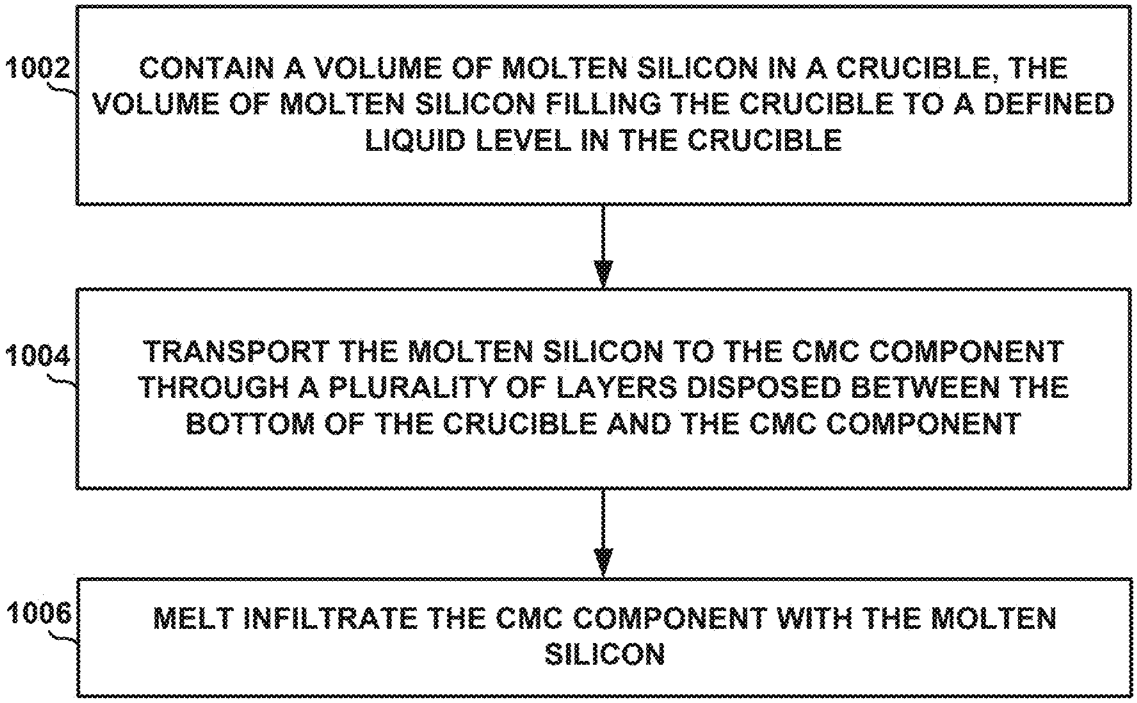
FIG. 10 is a flow diagram illustrating an example melt infiltration technique in accordance with one or more examples of the present disclosure.

FIG. 10 is a flow diagram illustrating an example melt infiltration technique for a CMC component in accordance with one or more examples of the present disclosure. The technique of FIG. 10 may be performed with melt infiltration apparatus 401 of FIG. 4, melt infiltration apparatus 501 of FIGS. 5A-5B, melt infiltration apparatus 501 of FIGS. 6A-6B, melt infiltration apparatus 701 of FIG. 7, or melt infiltration apparatus 801 of FIG. 8, although the described technique may be performed with other melt infiltration apparatus, and the described apparatus may be used to perform other techniques. The described technique may be executed to generate CMC component 300 of FIG. 3, rather than CMC component 100 of FIG. 1 or CMC component 200 of FIG. 2. The illustrated technique of FIG. 9 will be primarily described with concurrent reference to melt infiltration apparatus 401 of FIG. 4, melt infiltration apparatus 501 of FIGS. 5A-5B, melt infiltration apparatus 501 of FIGS. 6A-6B, melt infiltration apparatus 701 of FIG. 7, and melt infiltration apparatus 801 of FIG. 8.

With concurrent reference to FIGS. 5A and 5B, crucible 402 may contain a volume of molten silicon (1002). The volume of molten silicon may fill crucible 502 to a defined liquid level LL, here the molten silicon surface level 552 is displaced from bottom 550 by a certain distance. With concurrent reference to FIG. 4, plurality of molten silicon transport structures 410 may transport the molten silicon to CMC component 400 (1004). In some examples, plurality of molten silicon transport structures 410 may include first substructure 412, second substructure 414, and third substructure 416. The technique of FIG. 9 may further include melt infiltrating CMC component 400 with the molten silicon (906). In some examples, melt infiltrating CMC component 400 may include transporting the molten silicon through plurality of layer 410 to CMC component 400.

Various examples have been described. These and other examples are within the scope of the following examples and claims.

Example 1: A melt infiltration apparatus for a ceramic matrix composite (CMC) component, the melt infiltration apparatus includes a crucible, the crucible configured to contain a volume of molten silicon that infiltrates the CMC component during a melt infiltration process, the volume of molten silicon filling the crucible to a defined liquid level in the crucible; a first stabilizer configured to mechanically support the CMC component from a first side; and a second stabilizer configured to mechanically support the CMC component from a second side opposite the first side, wherein the first stabilizer and the second stabilizer are configured to suspend the CMC component above the defined liquid level during the melt infiltration process.

Example 2: The melt infiltration apparatus of example 1, wherein the first stabilizer and the second stabilizer are configured to suspend the entire CMC component above the defined liquid level during the melt infiltration process.

Example 3: The melt infiltration apparatus of any of examples 1 and 2, wherein the CMC component defines a void volume, and wherein the volume of the molten silicon is approximately equal to the void volume of the CMC component, such that the CMC component is fully infiltrated after the melt infiltration process.

Example 4: The melt infiltration apparatus of any of examples 1 through 3, wherein the first stabilizer and the second stabilizer are configured to contact a sacrificial portion of the CMC component that is configured to be removed by a machining process after the melt infiltration process.

Example 5: The melt infiltration apparatus of any of examples 1 through 4, wherein the first stabilizer or the second stabilizer include a base extending from a bottom of the crucible to the liquid level.

Example 6: The melt infiltration apparatus of any of examples 1 through 5, wherein at least one of the first stabilizer or the second stabilizer is configured to be mounted to an inner wall of the crucible to suspend the CMC component above the liquid level.

Example 7: The melt infiltration apparatus of example 6, wherein at least one of the first stabilizer or the second stabilizer includes a tenon and the inner wall of the crucible includes a mortise.

Example 8: The melt infiltration apparatus of any of examples 1 through 7, wherein at least one of the first stabilizer or the second stabilizer defines a recess configured to receive the CMC component.

Example 9: The melt infiltration apparatus of any of examples 1 through 8, wherein the crucible includes an overflow port that is configured to prevent the crucible from being overfilled above the liquid level.

Example 10: The melt infiltration apparatus of any of examples 1 through 9, further comprising a plurality of molten silicon transport structures disposed between a bottom of the crucible and the CMC component suspended above the liquid level, wherein the plurality of molten silicon transport structures are configured to transport the molten silicon to the CMC component for infiltration into the CMC component.

Example 11: The melt infiltration apparatus of example 10, wherein the plurality of molten silicon transport structures includes a first substructure, a second substructure, and a third substructure.

Example 12: The melt infiltration apparatus of example 11, wherein the first substructure includes a felt, the second substructure includes a wick, and the third substructure includes a coupling layer.

Example 13: The melt infiltration apparatus of example 12, wherein the felt is a pliable felt configured to completely cover the bottom of the crucible.

Example 14: The melt infiltration apparatus of any of examples 12 and 13, wherein the wick is a rigid graphite mesh.

Example 15: The melt infiltration apparatus of any of examples 12 through 14, wherein the coupling layer is a silicon carbide powder.

Example 16: A method for melt infiltrating a ceramic matrix composite (CMC) component includes containing a volume of molten silicon in a crucible, the volume of molten silicon filling the crucible to a defined liquid level in the crucible; suspending the CMC component above the defined liquid level using a first stabilizer mechanically supporting the CMC component from a first side and a second stabilizer configured to mechanically support the CMC component from a second side opposite the first side; and melt infiltrating the CMC component with the molten silicon.

Example 17: The method of example 16, wherein suspending the CMC component above the liquid level comprises suspending the entire CMC component above the liquid level.

Example 18: The method of any of examples 16 and 17, wherein the CMC component defines a void volume, and wherein the melt infiltrating the CMC component further comprises: fully infiltrating the void volume of the CMC component with the volume of molten silicon without excess molten silicon remaining.

Example 19: The method of any of examples 16 through 18, further comprising contacting a sacrificial portion of the CMC component with the first stabilizer and the second stabilizer.

Example 20: The method of example 19, further comprising removing, by a machining process after melt infiltrating the CMC component, the sacrificial portion of the CMC component.

What is claimed is:

1. A melt infiltration apparatus for a ceramic matrix composite (CMC) component, the melt infiltration apparatus comprising:

a crucible, the crucible configured to contain a volume of molten silicon that infiltrates the CMC component during a melt infiltration process, the volume of molten silicon filling the crucible to a defined liquid level in the crucible;

a first stabilizer configured to mechanically support the CMC component from a first side; and a second stabilizer configured to mechanically support the CMC component from a second side opposite the first side, wherein the first stabilizer and the second stabilizer are configured to suspend the CMC component above the defined liquid level during the melt infiltration process, and wherein the first stabilizer or the second stabilizer include a base extending from a bottom of the crucible to the defined liquid level.

2. The melt infiltration apparatus of claim 1, wherein the first stabilizer and the second stabilizer are configured to suspend the entire CMC component above the defined liquid level during the melt infiltration process.

3. The melt infiltration apparatus of claim 1, wherein the CMC component defines a void volume, and wherein the volume of the molten silicon is approximately equal to the void volume of the CMC component, such that the CMC component is fully infiltrated after the melt infiltration process.

4. The melt infiltration apparatus of claim 1, wherein the first stabilizer and the second stabilizer are configured to contact a sacrificial portion of the CMC component that is configured to be removed by a machining process after the melt infiltration process.

5. The melt infiltration apparatus of claim 1, wherein at least one of the first stabilizer or the second stabilizer is configured to be mounted to an inner wall of the crucible to suspend the CMC component above the defined liquid level.

6. The melt infiltration apparatus of claim 5, wherein at least one of the first stabilizer or the second stabilizer includes a tenon and the inner wall of the crucible includes a mortise.

7. The melt infiltration apparatus of claim 1, wherein at least one of the first stabilizer or the second stabilizer defines a recess configured to receive the CMC component.

8. The melt infiltration apparatus of claim 1, wherein the crucible includes an overflow port that is configured to prevent the crucible from being overfilled above the defined liquid level.

9. The melt infiltration apparatus of claim 1, further comprising a plurality of molten silicon transport structures disposed between a bottom of the crucible and the CMC component suspended above the defined liquid level, wherein the plurality of molten silicon transport structures are configured to transport the molten silicon to the CMC component for infiltration into the CMC component.

10. The melt infiltration apparatus of claim 9, wherein the plurality of molten silicon transport structures includes a first substructure, a second substructure, and a third substructure.

11. The melt infiltration apparatus of claim 10, wherein the first substructure includes a felt, the second substructure includes a wick, and the third substructure includes a coupling layer.

12. The melt infiltration apparatus of claim 11, wherein the felt is a pliable felt configured to completely cover the bottom of the crucible.

13. The melt infiltration apparatus of claim 11, wherein the wick is a rigid graphite mesh.

14. The melt infiltration apparatus of claim 11, wherein the coupling layer is a silicon carbide powder.

15. A melt infiltration apparatus for a ceramic matrix composite (CMC) component, the melt infiltration apparatus comprising:

a crucible, the crucible configured to contain a volume of molten silicon that infiltrates the CMC component during a melt infiltration process, the volume of molten silicon filling the crucible to a defined liquid level in the crucible;

a first stabilizer configured to mechanically support the CMC component from a first side; and a second stabilizer configured to mechanically support the CMC component from a second side opposite the first side, wherein the first stabilizer and the second stabilizer are configured to suspend the CMC component above the defined liquid level during the melt infiltration process, wherein at least one of the first stabilizer or the second stabilizer is configured to be mounted to an inner wall of the crucible to suspend the CMC component above the defined liquid level.

16. A melt infiltration apparatus for a ceramic matrix composite (CMC) component, the melt infiltration apparatus comprising:

a crucible, the crucible configured to contain a volume of molten silicon that infiltrates the CMC component during a melt infiltration process, the volume of molten silicon filling the crucible to a defined liquid level in the crucible;

a first stabilizer configured to mechanically support the CMC component from a first side;

a second stabilizer configured to mechanically support the CMC component from a second side opposite the first side; and a plurality of molten silicon transport structures disposed between a bottom of the crucible and the CMC component suspended above the defined liquid level, wherein the plurality of molten silicon transport structures are configured to transport the molten silicon to the CMC component for infiltration into the CMC component, and wherein the plurality of molten silicon transport structures includes a first substructure, a second substructure, and a third substructure, wherein the first stabilizer and the second stabilizer are configured to suspend the CMC component above the defined liquid level during the melt infiltration process.

* * * * *